July 14, 1931.  W. W. RIEDEL  1,814,264
SHOCK ABSORBER
Filed Sept. 7, 1929

Inventor
Walter W. Riedel
By
Spencer, Hardman & Felv
Attorney

Patented July 14, 1931

1,814,264

UNITED STATES PATENT OFFICE

WALTER W. RIEDEL, OF DAYTON, OHIO, ASSIGNOR TO DELCO PRODUCTS CORPORATION, OF DAYTON, OHIO, A CORPORATION OF DELAWARE

SHOCK ABSORBER

Application filed September 7, 1929. Serial No. 391,025.

This invention relates to improvements in hydraulic shock absorbers particularly adapted to control the movements of vehicle springs.

It is among the objects of the present invention to provide a shock absorber adapted to control both the compression and rebound movements of the springs of a vehicle.

Further objects and advantages of the present invention will be apparent from the following description, reference being had to the accompanying drawings, wherein a preferred embodiment of one form of the present invention is clearly shown.

Figure 1:
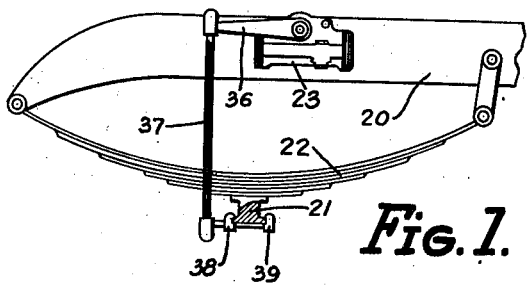
Fig. 1 is a side view of a portion of a vehicle chassis having the shock absorber secured thereto embodying the present invention.

Referring to the drawings, the numeral 20 designates the frame of the vehicle which is supported upon the vehicle axle 21 by vehicle springs 22, only one of which is shown.

The shock absorber comprises a casing 23 presenting a fluid reservoir 24 and a cylinder 25. The open ends of cylinder 25 receive screw plugs 26 and 27 which tightly close the cylinder ends. The casing is provided with apertures 28 for receiving bolts by which the casing is secured to the frame 20 of the vehicle.

A piston 29 having piston head portions 30 and 31 is reciprocably supported within the cylinder 25 and forms compression chambers 32 and 33 at the opposite ends of the cylinder 25.

Casing 23 has bearing portions in which is journalled a rocker shaft 34, said rocker shaft extending to the outside of the casing and having the shock absorber operating arm 36 provided thereon. The free end of the shock absorber operating arm 36 is swivelly secured to one end of the connecting link 37, the other end of said link being secured to the bracket 38 which is anchored to the axle 21 by the clamping member 39.

Within the casing 23 the rocker shaft 34 is provided with an arm 40 interposed between the lug portions 41 and 42 provided on the piston head portions 30 and 31 respectively. Lug portions 41 and 42 each have a passage 43, having a reduced portion for providing a valve-seat 44. A cage 45 is pressed into each recess 43, each cage holding a ball-check valve 46 so that said ball-check valves may be moved to permit fluid to flow through the passage 43 in the piston heads when the piston moves in a certain direction, and to close said passage against fluid flow when the piston moves in a certain opposite direction respectively. These valve structures are provided for replenishing the fluid supply within the compression chambers which, during the operation of the shock absorber, would have a tendency to leak past the pistons.

The compression chamber 33 has a passage 48 leading therefrom, while a similar passage 49 leads from the compression chamber 32. Both these passages communicate with a duct 50 provided in the casing, the ends of the duct being closed by the screw plugs 51.

Figure 4:
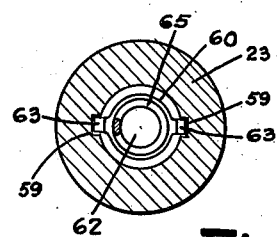
Fig. 4 is a fragmentary detail sectional view taken on the line 4—4 of Fig. 3.
Figure 3:
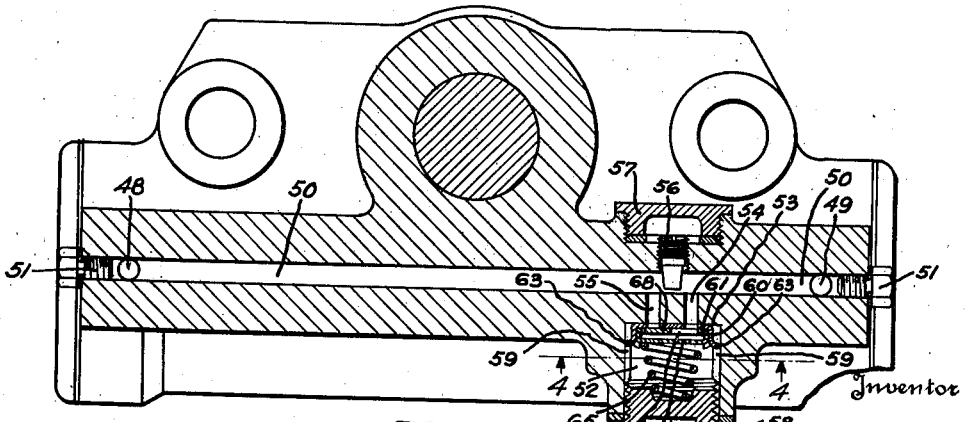
Fig. 3 is a longitudinal sectional view taken through the shock absorber, showing the fluid flow controlling valve mechanism.

As shown in the Fig. 3, casing 23 is provided with a recess 52, providing a valve-chamber. The bottom wall 53 of said recess provides a valve-seat. Two substantially parallel passages 54 and 55 are provided in the casing, one end of said passages connecting with the duct 50, the other ends of the passage terminating in the valve seat 53. A screw-threaded aperture in the casing receives a metering pin 56, the end of which extends into the duct 50 substantially midway between the parallel passages 54 and 55, said metering pin providing a constant restriction to the flow of fluid to the duct 50. A screw plug or cover cap 57 is provided in an enlarged recess surrounding the metering pin 56, a suitable gasket being provided with the cover 57 to prevent fluid leakage at this point. Another screw cap 58 is received by the open end of the valve chamber 52, a gasket being provided in connection with cap 58 for preventing fluid leaks at this point. On diametrically opposite sides of the valve-chamber 52 there are provided longitudinal grooves 59 as shown in the Figs. 3 and 4.

A double-acting unitary valve structure is contained within the valve chamber 52. This valve structure comprises a cup-shaped member 60 containing a disc valve 61 which is held in proper position within the cup-shaped member 60 by another cup-shaped member 62 retained within the cup-shaped member 60 by having the outer peripheral edge of said cup-shaped member 60 spun over it. Diametrically opposite tongue portions 63 formed out of the peripheral edge of the cup-shaped member 60 extend outwardly so as to project into the slots 59 in the casing whereby the valve structure may slide within the valve chamber 52 without rotating relative thereto. The two cup-shaped members 60 and 62 being secured together as described, provide a hollow member in which the disc valve 61 is properly secured. A spring 65 is interposed between the cover cap 58 and the cup-shaped member 62, said springs normally urging this valve assembly so that the outer flat surface of the cup-shaped member 62 is normally urged into engagement with the valve seat 53. The portion of the cup-shaped member 60 engaging the valve seat 53 is provided with two apertures, each of which aligns and coincides with a respective longitudinal passage 54 and 55.

Figure 5:
Fig. 5 is a detail view of the disc valve.

As shown in the Fig. 5, the disc valve 61 has an annular portion 66 which is adapted to be clamped between the cup-shaped members 60 and 62 and thus the disc is properly gripped between said members. The disc valve comprises a flexible tongue portion 68, the free end thereof being adapted normally to close the aperture in the cup-shaped member 60 which coincides with the longitudinal passage 55 in the casing. An aperture 69 is provided in the disc valve 61 which coincides with the aperture in the cup-shaped member 60, aligning with the longitudinal passage 54.

Figure 2:
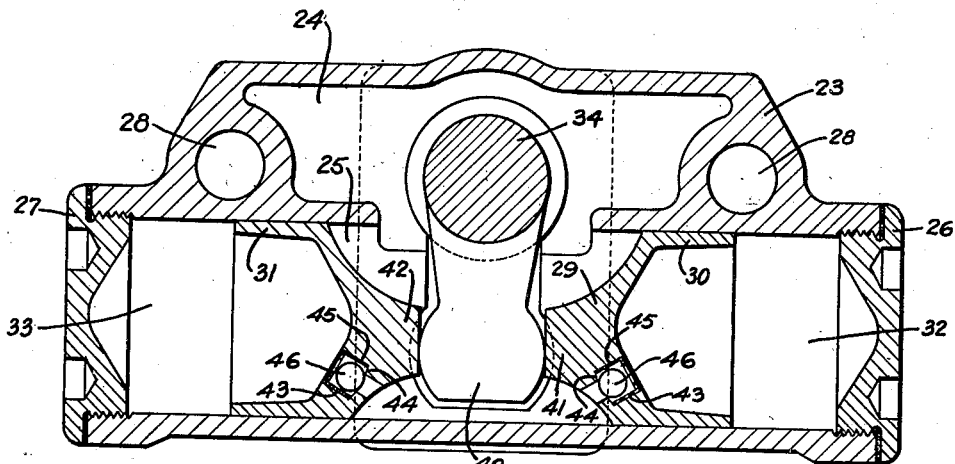
Fig. 2 is a longitudinal sectional view taken through the center of the shock absorber cylinders.

The operation of the device is as follows:

When the road wheels of the vehicle, not shown, but mounted upon the axle 21, strike an obstruction in the roadway, springs 22 will be flexed upwardly toward the frame 20. This movement causes a resultant clockwise rotation of the operating arm 36 due to the link connection 37 which causes a clockwise rotation of the arm 40 within the shock absorber casing 23, thus the piston 29 will be moved toward the left as regards Fig. 2. Any fluid within the compression chamber 35 will now have pressure exerted thereon, thus forcing the fluid through the passage 48 into the duct 50 and past the metering pin 56 through passage 49 into the compression chamber 32, the cubical contents of which is being enlarged by the movement of the piston 29 toward the left. If the fluid pressure does not exceed a predetermined value, the restriction by the metering pin 56 will not cause fluid pressure to move the tongue 68 of the valve nor the entire valve assembly including cup-shaped members 60 and 62. However, if the pressure in compression chamber 33, is of such a degree that the orifice presented in the duct 50 about the metering pin 56 is not sufficient to provide proper pressure release, then the excess pressure will move the tongue 68 of the disc valve 61 so that communication will be established between the parallel passage 55 and the corresponding passage 54, thus an additional fluid pressure relieving flow is established. If, the pressure in the compression chamber 33 be still more increased so that the combined flows past the metering pin 56 and the tongue 68 of the disc valve 61 be not sufficient to provide proper release, then the pressure acting upon the valve assembly, including cup-shaped members 60 and 62, will move said valve assembly against the effect of spring 65 to establish an additional flow between the passages 55 and 54 to provide pressure release.

From this it may be seen that the vehicle spring compression movement is controlled three-fold, that is, slight movement by the restriction to the flow of fluid by the metering pin 56, more extensive movements by the restriction of the fluid flow by the metering pin and disc valve, and excessive movements of the vehicle springs by the restriction of the metering pin, disc valve and the entire valve assembly moving bodily to establish a flow. Thus excessive movement of the spring, causing excessive pressures, will be compensated for automatically.

As soon as the vehicle springs 22 have reached the limit of their flexure caused by the particular obstruction in the highway, they will have a tendency to return to normal, unflexed position with a sudden rebounding movement which, if uncontrolled, results in disagreeable jars and shocks being transmitted to the frame of the vehicle. The present device controls also the return movement of the vehicle springs to the normal position. When the springs begin to return, the linkage connection with the shock absorber will result in counter-clockwise rotation of the shock absorber operating arm 36 and consequently the arm 40 within the casing 23. Now piston 29 will move toward the right as regards Fig. 2 and pressure exerted upon the fluid in chamber 32 will force said fluid through the passage 49 into the duct 50, this fluid flow being restricted by the metering pin 56 so that within a certain degree of pressure, the movement of the spring 22 toward normal position will be resisted by the restriction offered by the metering pin 56. The pressure from passage 49 is exerted through the parallel passage 54 and through aperture 69 of the disc valve upon the relief side of the disc valve tongue portion 68 so that the pressure in this direction will have the effect of more tightly pressing said tongue to close the other parallel passage 55. If, however, the fluid pressure from the passage 49 reaches a predetermined value, then the pressure within the valve assembly including cup-shaped members 60 and 62 will move said valve assembly against the effect of spring 65 to establish a flow through the parallel passages 54 and 55 in order to compensate for the excess fluid pressure.

From this it may be seen that the fluid flow from the compression chamber 32 to the compression chamber 33 in response to the rebound movement of the vehicle springs 22 will be controlled two-fold, the smaller or less extensive movement of the springs by the constant restriction offered by the metering pin 56, the more extensive movements of the springs by the restriction offered by both the metering pin and the fluid passing through the parallel passages 54 and 55.

The cap 58 is removable so that, if desired, various types of valve assembly may be inserted within the valve chamber 52, that is, if greater resistance to the movement of the springs is desired, a valve assembly with a stiffer disc valve 61 is substituted, or a stiffer spring 61 is placed within the chamber 52 whereas if a freer movement of the vehicle springs 22 is desired, a lighter disc valve 61 may be used or a lighter spring 65.

Cover cap 57 may be removed and the metering pin 56 may be adjusted also to alter the constant restriction to the flow of fluid in both directions through the duct 50.

While the form of embodiment of the present invention as herein disclosed, constitutes a preferred form, it is to be understood that other forms might be adopted, all coming within the scope of the claims which follow.

What is claimed is as follows:

1. A shock absorber comprising in combination, a casing presenting a fluid reservoir and a cylinder; a piston in said cylinder forming two compression chambers therein; a duct providing communication between said chambers; and means for controlling the flow of fluid through said duct, said means comprising a constant flow orifice adapted constantly to restrict the flow of fluid through said duct in both directions, a valve adapted to establish a restricted flow of fluid around said constant flow orifice in one direction only, in repsonse to increased fluid pressure in the one compression chamber, and a valve adapted to establish an increased flow of fluid around said constant flow orifice in both directions in response to still greater fluid pressures in the compression chambers.

2. A shock absorber comprising in combination, a casing presenting a fluid reservoir and a cylinder; a piston in said cylinder forming two compression chambers therein; a duct providing communication between said chambers; and means for controlling the flow of fluid through said duct, said means comprising a constant flow orifice adapted constantly to restrict the flow of fluid through said duct in both directions, a disc valve adapted to establish a restricted flow of fluid around said constant flow orifice in one direction only, in response to increased fluid pressure in the one compression chamber; and a valve supporting the disc-valve and movable bodily to establish an increased flow of fluid around said constant flow orifice in both directions in response to still greater fluid pressures in the compression chambers.

3. A shock absorber comprising in combination, a casing presenting a fluid reservoir and a cylinder; a piston in said cylinder forming two compression chambers therein; a duct providing communication between the compression chambers; a metering pin extending into said duct to restrict the flow of fluid therethrough; a by-pass for said duct around the metering pin; and valves for controlling the flow of fluid through said by-pass, one valve establishing a flow of fluid through said by-pass in one direction only in response to fluid pressure increase in one of the chambers; the other valve being adapted to establish a flow of fluid in either direction through the by-pass in response to fluid pressure increase in the respective compression chambers.

4. A shock absorber comprising in combination, a casing presenting a fluid reservoir and a cylinder; a piston in the cylinder forming two compression chambers therein; means for operating the piston; a duct providing communication between the compression chambers; a metering pin extending into said duct to restrict the flow of fluid therethrough; a by-pass for said duct around the metering pin; and a double acting valve of unitary structure, said valve being bodily movable in response to fluid pressure increases in the respective compression chambers to establish a flow of fluid through the by-pass in either direction, one portion of said valve structure being movable, in response to increased fluid pressure in the one direction only, to establish a flow of fluid through said by-pass in this one direction only.

5. A shock absorber comprising in combination, a casing presenting a fluid reservoir and a cylinder; a piston in the cylinder forming two compression chambers therein; means for operating the piston; a duct leading from one compression chamber to the other; a valve chamber in the casing presenting a valve-seat; two parallel passages connecting the duct with the valve chamber, said passages terminating in the valve-seat; a metering pin adjustably carried by the casing and extending into the duct substantially between the parallel passages, said metering pin offering a constant restriction to the flow of fluid through the duct; a valve in the valve-chamber for controlling the flow of fluid through the parallel passages said valve being adapted to establish divided and variably restricted flow of fluid through said passages in the one direction in response to proper fluid pressures and only one flow through said passages in the other direction in response to a proper fluid pressure.

6. A shock absorber comprising in combination, a casing presenting a fluid reservoir and a cylinder; a piston in the cylinder forming two compression chambers therein; means for operating the piston; a duct leading from one compression chamber to the other; a valve chamber in the casing presenting a valve-seat; two parallel passages connecting the duct with the valve chamber said passages terminating in the valve-seat; a metering pin adjustably carried by the casing and extending into the duct substantially between the parallel passages, said metering pin offering a constant restriction to the flow of fluid through the duct; a valve in the valve-chamber for controlling the flow of fluid through the parallel passages, said valve comprising a hollow member slidably carried within the valve-chamber and having provisions for preventing rotative motion thereof relative to the casing, said member being apertured to coincide with the parallel passages so that said passages communicate with the interior of said hollow member when it is yieldably urged into engagement with the valve-seat and a disc valve within said hollow member one portion normally closing one of the apertures in said member which alines with one of the parallel passages, said disc valve being apertured to maintain constant communication between the other parallel passage and the interior of the hollow member.

In testimony whereof I hereto affix my signature.

WALTER W. RIEDEL.